Patented Nov. 8, 1949

2,487,300

UNITED STATES PATENT OFFICE 2,487,300

SEPARATION OF NITRILES

Richard B. Bishop, Haddonfield, N. J., assignor to Socony-Vacuum Oil Company, Incorporated, a corporation of New York No Drawing. Application February 6, 1948, Serial No. 6,799

2 Claims. (Cl. 260—465)

This invention relates to the separation of nitriles from mixtures containing them, and particularly to the separation of aromatic polynitriles from mixtures which also contain aromatic mononitriles and hydrocarbons.

In accordance with the following patent applications, aromatic mononitriles and aromatic polynitriles can be prepared by reacting aromatic hydrocarbons with ammonia, at elevated temperatures and in the presence of a catalyst selected from the group consisting of molybdenum oxide, tungsten oxide, and vanadium oxide: Serial No. 641,640, filed January 16, 1946, now Patent No. 2,450,632, and Serial No. 643,742, filed January 26, 1946, now abandoned by Caldwell and Chapman; Serial No. 649,118, filed February 20, 1946, now Patent No. 2,450,639, and Serial No. 653,435, filed March 9, 1946, now Patent No. 2,450,640, by Denton and Bishop.

In preparing nitriles in accordance with the teachings of the aforementioned applications, it has been found desirable to use a mixture of hydrocarbons such as, for example, an aromatic solvent obtained from catalytic cracking, which is a mixture of hydrocarbons about 60% to 70% of which are aromatic, and which has a boiling range of from about 280 to 370° F., a specific gravity of about 0.8443 and a mixed aniline point of about 79° F.

The products resulting from carrying out the processes of the above applications consist of a mixture of various hydrocarbons and various aromatic nitriles, and when part of the aromatics used in the charge have more than one side chain, aromatic polynitriles are formed as well as aromatic mononitriles.

While most of the aromatic mononitriles and hydrocarbons may be separated from the aromatic polynitriles by distillation, if the temperature of the distillation is carried too high, sublimation of the aromatic polynitriles interferes with the separation, and polymerization, charring and other deterioration of the products is likely to result. As a consequence, it is preferred to remove a substantial portion of the hydrocarbons and aromatic mononitriles by distillation, leaving a residue of black, tarry, high-boiling compounds, which includes the aromatic polynitriles and certain high-boiling hydrocarbons and a minor amount of aromatic mononitriles.

Experience has shown that the separation of aromatic nitriles from hydrocarbons, and the separation of aromatic polynitriles from aromatic mononitriles, is not always easy of accomplishment. For example, Ralston and Pool in United States Letters Patent 2,133,007, explain at considerable length the difficulties encountered in the separation of aliphatic nitriles from admixtures thereof with hydrocarbons. The difficulties encountered in such separations, however, are not nearly so severe as the difficulties encountered in attempting to separate aromatic polynitriles from the black, tarry, high-boiling residue described hereinbefore, which contains not only aromatic polynitriles and hydrocarbons, but also aromatic mononitriles. Furthermore, the hydrocarbons in this black, tarry residue are high-boiling hydrocarbons that are far more difficult to separate from the aromatic polynitriles than would be the simple, low-boiling hydrocarbons of the Ralston and Pool patent.

Ralston and Pool have pointed out that the separation of even the simpler nitriles and relatively low-boiling hydrocarbons, presents a problem that is different from the problems of ordinary solvent extraction. Far more difficult is the problem of extracting aromatic polynitriles from the black, tarry, high-boiling residue described above. The water-alcohol mixtures of Ralston and Pool are completely ineffective for this purpose.

According to the present invention, it has been found that this high-boiling, black, tarry material may be extracted with absolute ethyl alcohol (95% or above) and the aromatic polynitriles contained therein thus isolated. This solvent dissolves almost the entire product while hot but on cooling throws out as a precipitate practically all of the aromatic polynitriles, while maintaining in solution the hydrocarbons and aromatic mononitriles. The extraction is preferably accomplished by heating and stirring the tarry mixture with the absolute alcohol, filtering and, thereafter, reducing the temperature sufficiently to cause crystallization of the dissolved aromatic polynitriles. The aromatic polynitriles so recovered can be redissolved and recrystallized, or sublimed, to further purify them.

A small amount of aromatic mononitriles can usually be recovered from the solvent after the aromatic polynitriles have been recovered, by distilling off the solvent and fractionally distilling the liquid product that is left behind. Once the aromatic mononitriles have been distilled from this liquid product, the remainder contains practically no nitrogen.

A further understanding of the details and advantages of this invention may be had by consideration of the following specific example,

Example p-Xylene and ammonia were passed over a molybdenum oxide catalyst at about 1000° F. at 90 lbs./sq. in. gauge pressure in a molecular ratio of 2:1. The product was distilled to recover the unreacted p-xylene and most of the aromatic mononitriles formed. The residue was a mixture of black, tarry, high-boiling compounds. This residue (610 g.) was treated with 3 liters of alcohol (95%) by heating and stirring and then filtering. The filtrate was chilled to a temperature of about 0° C. whereupon 185 g. of a brownish powder separated. This powder was again dissolved in alcohol (95%), filtered, and again crystallized by chilling to about 0° C. Another portion was purified by sublimation. Both portions had a melting point of 226° C., which corresponds to terephthalic nitrile, (dinitrile 1,4-dicyano benzene), which, according to the literature, has a melting point of 226° C.

The alcohol used for the separation was distilled leaving a quantity of a yellow liquid oil. This oil was vacuum distilled at 4 mm. of mercury pressure and a minor quantity of aromatic mononitriles was obtained therefrom. The remainder contained practically no nitrogen.

While this invention has been explained as applied to a particular type of mixture of aromatic polynitriles with high-boiling hydrocarbons, it can be applied effectively to the separation of aromatic polynitriles from any other mixture of aromatic polynitriles and high-boiling hydrocarbons, with or without aromatic mononitriles being present.

The amount of absolute alcohol necessary will obviously depend upon the amount of aromatic polynitriles to be dissolved and recrystallized. Any amount sufficient to dissolve all or substantially all of the aromatic polynitriles at the temperature applied, will be satisfactory. Large excesses over this amount will obviously be impractical.

If sufficient quantities of absolute alcohol are used and the treatment continued long enough, the aromatic polynitriles can be dissolved without any heating. However, it is preferred to heat the alcohol sufficiently to increase its solvent power insofar as is practical, under the conditions of operation. Thus when operating in open vessels the alcohol cannot be heated above its boiling point. However, when the operation is accomplished in pressure equipment, as it normally will be, temperatures up to 150° C. or even above may be used to advantage.

The temperature to which the alcohol is lowered to precipitate the aromatic polynitriles will be whatever is necessary to effect that precipitation. Usually a temperature of around 0° C. is quite satisfactory. The aromatic polynitriles can be precipitated by evaporation of the solvent rather than by cooling if so desired, but this is a less preferred modification.

What is claimed is:

1. A method of separating aromatic polynitriles from a mixture of aromatic polynitriles, aromatic mononitriles and aromatic hydrocarbons, which comprises treating said mixture with hot ethyl alcohol containing not more than 5 per cent water to dissolve the aromatic polynitriles to form an alcohol extract, separating said alcohol extract, lowering the temperature of said alcohol extract sufficiently to precipitate said aromatic polynitriles in preference to the aromatic mononitriles and aromatic hydrocarbons, and separating said aromatic polynitriles from said alcohol extract.

2. A method of separating dicyano benzene from a mixture of dicyano benzene, xylene and toluonitrile, which comprises treating said mixture with hot ethyl alcohol containing not more than 5 per cent water to dissolve the dicyano benzene to form an alcohol extract, separating said alcohol extract, lowering the temperature of said alcohol extract sufficiently to precipitate said dicyano benzene in preference to the toluonitrile and xylene, and separating dicyano benzene from said alcohol extract.

RICHARD B. BISHOP.

REFERENCES CITED

The following references are of record in the file of this patent:

UNITED STATES PATENTS

| Number | Name | Date |
| --- | --- | --- |
| 2,133,007 | Ralston et al. | Oct. 11, 1938 |
| 2,174,568 | Davies et al. | Oct. 3, 1939 |
| 2,305,529 | Hester et al. | Dec. 15, 1942 |

OTHER REFERENCES

Gattermann, "Org. Chemistry" (Macimillan, 1896), pp. 1–15.